April 11, 1961   O. S. JÖNSSON   2,978,738
METHOD OF TREATING ANIMAL CARCASSES
Filed Sept. 11, 1958
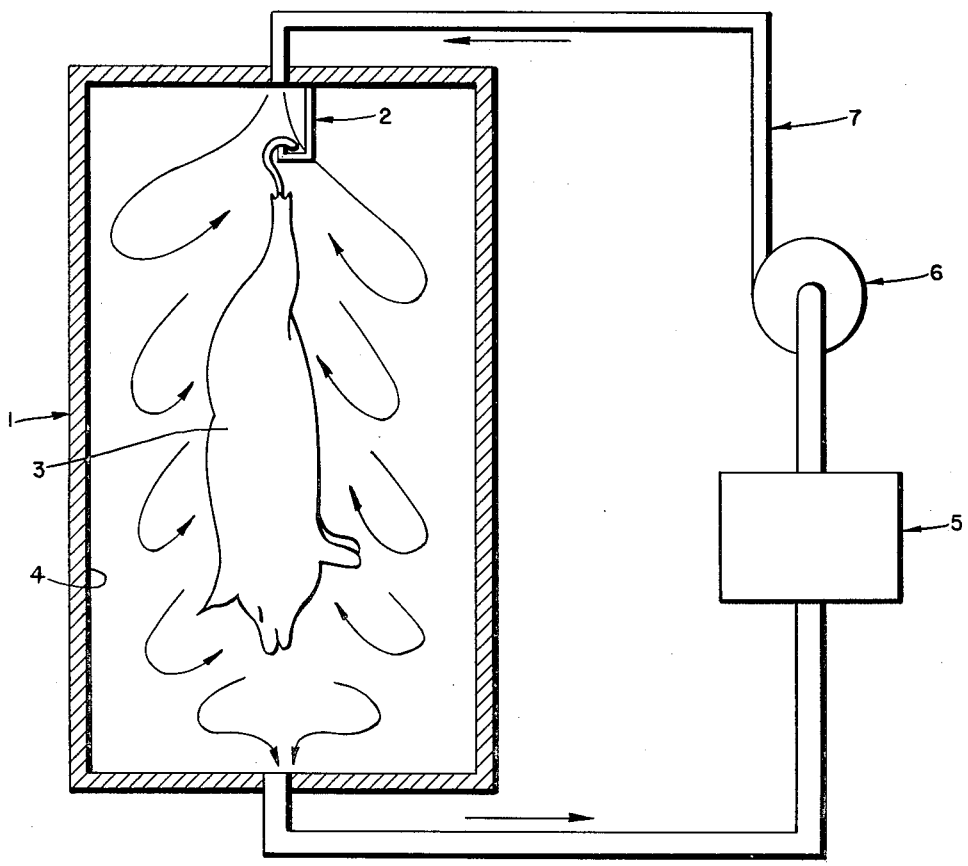

2,978,738

METHOD OF TREATING ANIMAL CARCASSES

Olle Sigurd Jönsson, Kellgrensgatan 24, Boras, Sweden

Filed Sept. 11, 1958, Ser. No. 760,417

Claims priority, application Sweden Sept. 14, 1957

2 Claims. (Cl. 17—45)

This invention relates to a method of treating slaughtered animals to give them a durable surface. It is characterized by the fact that circulating hot air is caused to act on the carcasses. The method according to the invention is applicable to all kinds of animals to be slaughtered, but it is specifically suited, as will appear from the following description, for pigs as well as for animals such as large cattle, calves and the like which are skinned at the slaughter.

At present, pigs are slaughtered in the following manner. After it has been stuck, the pig is scalded by being lowered into a water bath of about 60° C. At the scalding the epidermis and bristles come loose. After scalding the pig carcass is passed through a scraping machine which removes the epidermis and hairs. Casings, offals, tallow etc. are then removed from the carcass, inspected by veterinary and stamped, whereupon the carcass is passed to cold chambers and from there to the place of sale. The carcass is sold in this condition under the designation of scalded carcass.

A scalded pig carcass often presents after short or long transports a wet surface which, after some time, will develop slime over extensive areas. Particularly during the hot season, condition damages often appear on the carcass, particularly the head, feet and crotch portions. The scalded carcass thus is of low durability, and it is this disadvantage that the present invention aims at overcoming.

Earlier it has been tried to bring about the durability of carcasses, particularly pig carcasses by singeing, i.e. by radiation heat. Singeing was effected in so-called singe ovens by means of oil burners, whereby the carcasses were blackened and had to be passed through machines for cutting away the blackened portions. Singeing also entails the disadvantage that the surface treatment will be irregular inasmuch as it is very difficult to bring about a uniform action of the radiation heat on the surface of the carcass.

According to the invention, a durable, dry and firm surface is provided by causing circulating hot air to act on the carcasses. The hot air penetrates everywhere, and the surface treatment will consequently be uniform. By this penetration of the air the advantage is also gained that it is possible to work with a lower temperature than in the case of radiation heat. It will thus be possible to give the hot air so low a temperature as 600° C. and possibly still lower. As a rule, the temperature of the hot air will lie at a maximum of about 800° C. Treating the carcasses with the circulating hot air takes but a very short time. The time required will as a rule be less than one minute; normally it is about 15 to 20 seconds.

In a further development of the method according to the invention, which is particularly adapted for pig carcasses and the like, remaining hairs, bristles or the like are removed from the carcasses by burning them with an open flame after the hair roots or like roots in the skin have been dried out by the hot air treatment. The burning with an open flame must be effected only during a few seconds, preferably 3 to 5 seconds, for the flame should not in any way take part in the surface treatment proper. Said burning should as a rule not be performed immediately after the hot air treatment, as the steam should first be allowed to escape from the carcass. The interval between the hot air treatment and the burning with an open flame should be about 10 to 15 seconds.

Said further development of the invention is based on the observation that it is not possible to burn away remaining hairs, bristles or the like close to the roots as long as the surface of the carcass and the roots therein are wet and water-filled. This cannot even be done with a gas flame, oil burner and the like, which is due to the fact that the more heat that is supplied to the surface the heavier will be the formation of steam that protects hairs, bristles and the like against burning. Therefore, only after skin pockets and hair bulbs have been dried out by the hot air treatment, it is possible really to burn away hairs, bristles and the like. The burning operation thus is very easily performed and takes but a very short time, which is important in order that the surface treatment may not be impaired.

It is of the utmost importance that the slaughter of all animals, specifically of all those that are skinned at the slaughter, is effected in such a way that the meat is not soiled or contaminated by e.g. the excrement etc. of the slaughtered animal that may be found on the slaughter-house floor. It is therefore important that the slaughter be effected while observing the utmost cleanliness and hygiene. It has not been possible hitherto to pour water over and to rinse the carcasses to the desired extent, as carcasses having a wet and moist surface have proved to be but of low durability, and on the moist surface bacteria and other micro-organisms have propagated very rapidly, which entails spreading sliminess and unpleasant odor. The carcasses thus present reduced durability, and after long transports they often have to be sold at reduced prices, particularly in hot countries.

The method according to the invention has made it possible to effect, after the slaughter, a thorough rinsing of the slaughtered carcass so that impurities and so on are completely removed from it. The hot air treatment after said cleaning gives the carcass a dry, durable and pure surface. The blood water occurring on the carcass is removed and the meat of and accumulation of fat on the carcass appears in a first-class, pleasing manner. After the hot air treatment the carcass should be moved directly to cold chambers.

In this case also, the treatment with the circulating hot air should be effected for a very short time, generally for about 15 to 20 seconds. According to one embodiment, the temperature of the circulating hot air is about 500° C., but it can be varied within certain limits.

Treating the surface of the carcasses with hot air entails a pasteurization thereof, which also contributes to the durability gained by the present invention.

The drawing shows in somewhat schematic form a device which may used for the hot air treatment of carcasses in accordance with my invention.

The device is a convection oven 1 which is provided with a conveying means 2 for the carcasses 3 so that they can be caused continuously to pass along a path through the oven 1.

As no open flame occurs in the oven chamber, the best prerequisites prevail of keeping it clean and hygienic. This is further facilitated by the oven 1 having its inner surface 4 coated with stainless metal sheets or the like. The oven 1 is of course provided with a source of heat 5.

An essential prerequisite for the good result gained by the invention is that the air circulates. For this purpose the oven 1 is provided with a fan 6. The oven 1 can also have vanes (not shown) that contribute to making said circulation more efficient. As shown in the drawing, the fan 6 is arranged in the conduit 7 between the source of heat 5 and the oven 1, and a return conduit from oven 1 to heater 5 recirculates the air. Thus, as indicated in the drawing, the recirculating hot air flows generally in a direction which is transverse to the path of carcass 3 through the oven as defined by conveyor 2, and in doing so it circulates thoroughly over the surfaces of the carcass.

To avoid heat losses at the transport of the carcasses into and out of the convection oven 1 it should preferably be equipped with a prechamber and a postchamber which thus serve as heat sluices.

In the cases where the burning with an open flame is performed immediately after the hot air treatment, the device for producing the open flame can to advantage be located in the postchamber of the convection oven. If, on the other hand, the burning with an open flame should take place after a certain interval, the device for producing the open flame should be separated from the convection oven.

What I claim and desire to secure by Letters Patent is:

1. The method of treating carcasses to give them durable, dry and firm surfaces which comprises conveying them in sequence along a path and subjecting each of them in succession to the action of hot dry air having a temperature in the range from about 500° C. to about 800° C. for a period of not over one minute, said air circulating over the surfaces of the successive carcasses and flowing generally in a direction transverse to said path, whereby said surfaces are pasteurized and thoroughly dried, thereby inhibiting spoilage.

2. The method of treating carcasses to give them durable, dry and firm surfaces which comprises conveying them in sequence along a path and subjecting each of them in succession to the action of hot dry air having a temperature in the range from about 500° C. to about 600° C. for a period of not over one minute, said air circulating over the surfaces of the successive carcasses and flowing generally in a direction transverse to said path, whereby said surfaces are pasteurized and thoroughly dried, thereby inhibiting spoilage.

References Cited in the file of this patent

UNITED STATES PATENTS

| | | |
|---|---|---|
| 844,153 | Loescher | Feb. 12, 1907 |
| 2,100,299 | Tobin | Nov. 23, 1937 |
| 2,296,806 | Buckholdt | Sept. 22, 1942 |
| 2,393,521 | Duncan et al. | Jan. 22, 1946 |
| 2,558,338 | Clements | June 26, 1951 |
| 2,715,749 | Coughenour | Aug. 23, 1955 |

FOREIGN PATENTS

| | | |
|---|---|---|
| 660,037 | Great Britain | Oct. 31, 1951 |